US009283819B2

(12) United States Patent
Salter et al.

(10) Patent No.: US 9,283,819 B2
(45) Date of Patent: Mar. 15, 2016

(54) VEHICLE WHEEL ASSEMBLY EXTERNAL ILLUMINATION LAMP

(71) Applicant: Ford Global Technologies, LLC, Dearborn, MI (US)

(72) Inventors: Stuart C. Salter, White Lake, MI (US); Cornel Lewis Gardner, Romulus, MI (US); Ali Ammar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 14/087,048

(22) Filed: Nov. 22, 2013

(65) Prior Publication Data

US 2015/0145668 A1 May 28, 2015

(51) Int. Cl.
| G08B 21/00 | (2006.01) |
| B60C 23/02 | (2006.01) |
| B60C 23/04 | (2006.01) |
| B60Q 1/26 | (2006.01) |
| G01M 17/02 | (2006.01) |
| B60Q 1/32 | (2006.01) |
| B60Q 1/38 | (2006.01) |

(52) U.S. Cl.
CPC ............. B60C 23/02 (2013.01); B60C 23/0406 (2013.01); B60Q 1/26 (2013.01); B60Q 1/326 (2013.01); G01M 17/027 (2013.01); *B60Q 1/38* (2013.01); *B60Q 2400/40* (2013.01)

(58) Field of Classification Search
CPC ...................................................... B60C 23/02
USPC .......... 340/463, 468–471, 475, 479; 362/459, 362/487, 495, 500, 506
See application file for complete search history.

(56) References Cited

U.S. PATENT DOCUMENTS

| 4,059,823 | A | | 11/1977 | Martin et al. | |
| 5,465,194 | A | * | 11/1995 | Currie | ........................ 362/464 |
| 5,844,479 | A | * | 12/1998 | Walton | ........................ 340/479 |
| 8,097,843 | B2 | | 1/2012 | Agrawal et al. | |
| 8,178,852 | B2 | | 5/2012 | Kingsley et al. | |
| 8,232,533 | B2 | | 7/2012 | Kingsley et al. | |
| 8,247,761 | B1 | | 8/2012 | Agrawal et al. | |
| 8,415,642 | B2 | | 4/2013 | Kingsley et al. | |
| 2006/0208865 | A1 | | 9/2006 | Quach et al. | |
| 2006/0239018 | A1 | | 10/2006 | Jardin | |
| 2011/0012062 | A1 | | 1/2011 | Agrawal et al. | |

FOREIGN PATENT DOCUMENTS

| EP | 2380758 A1 | 10/2011 |
| JP | 2005231519 A | 9/2005 |
| WO | 2008145937 A1 | 12/2008 |

OTHER PUBLICATIONS

"Tire Pressure LED Alarm System," www.tirepressureled.com/tire-pressure-led/, 3 pages, copyrighted 2013 by Automotive Upgrade Technology Inc.

* cited by examiner

Primary Examiner — Jeffery Hofsass
(74) Attorney, Agent, or Firm — Jason Rogers; Price Heneveld LLP

(57) ABSTRACT

A vehicle tire pressure indicator and tire illumination assembly is provided. The assembly includes a light source located on the body of a vehicle near the wheel well and oriented to direct light onto a wheel assembly having a tire. A tire pressure indicator detects air inflation pressure of the tire. The light source illuminates the wheel assembly with a desired color to indicate a tire pressure status based on the detected tire pressure. In addition, the light source may be illuminated to provide puddle lamp and area lighting and turn signal indication.

20 Claims, 5 Drawing Sheets

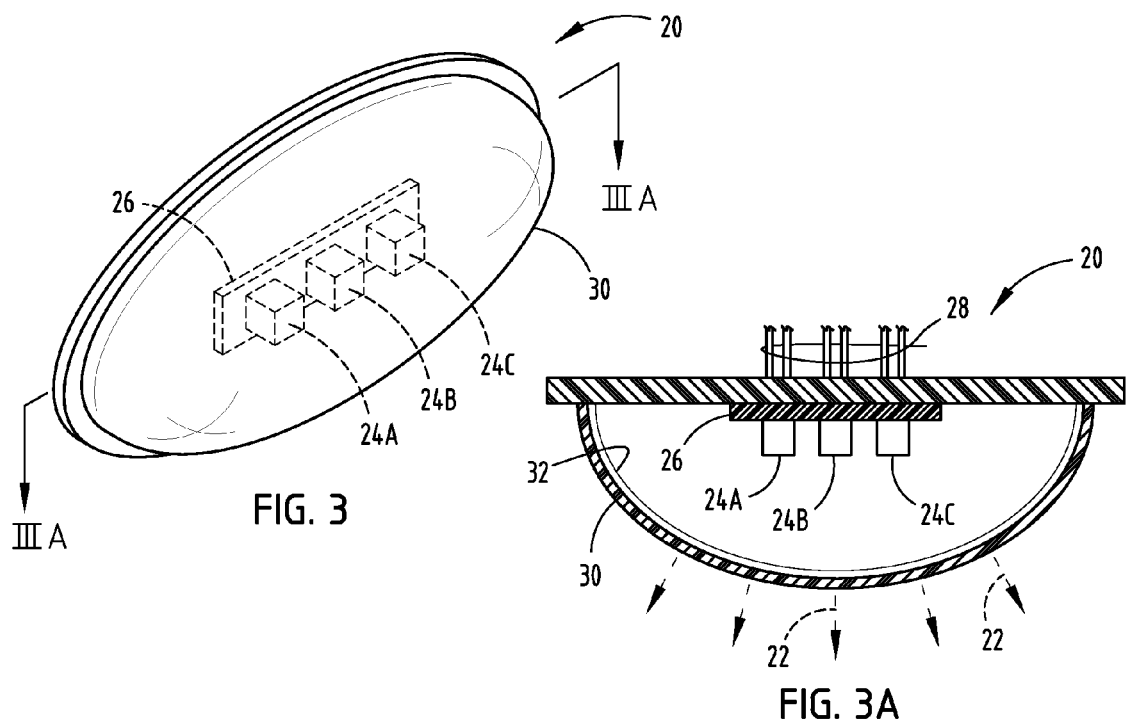
FIG. 3
FIG. 3A
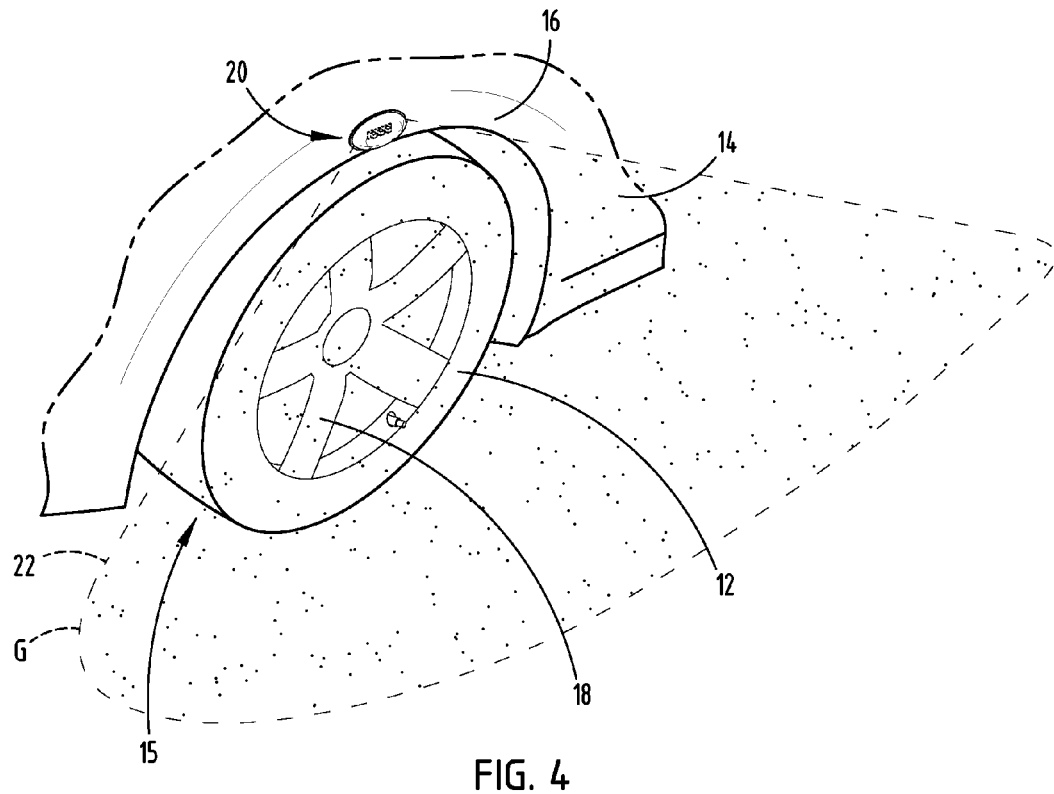
FIG. 4

VEHICLE WHEEL ASSEMBLY EXTERNAL ILLUMINATION LAMP

FIELD OF THE INVENTION

The present invention generally relates to vehicle exterior lighting, and more particularly relates to a body-mounted lamp for illuminating the tire on a vehicle.

BACKGROUND OF THE INVENTION

Automotive wheeled vehicles employ wheels having inflated tires that are designed to operate efficiently within a certain tire air pressure range. Some vehicles are equipped with tire pressure monitors for monitoring the tire air pressure and provide an indicator such as a warning on a display in the instrument cluster when the tire pressure is low while the vehicle is operating. It is desirable to provide for a tire pressure indicator to indicate the status of the tire that is readily discernible by a vehicle operator, such as when the vehicle is not operating.

SUMMARY OF THE INVENTION

According to one aspect of the present invention, a vehicle wheel illumination assembly is provided. The assembly includes a light source located on a vehicle body and arranged to illuminate a wheel assembly of the vehicle to indicate a tire pressure status.

According to another aspect of the present invention, a vehicle tire pressure indicator assembly is provided. The assembly includes a light source located on a body of a vehicle and a tire pressure detector for detecting air inflation pressure of a tire on a wheel assembly of the vehicle, wherein the light source illuminates the wheel assembly to indicate a tire pressure status based on the detected tire pressure.

According to a further aspect of the present invention, a method of illuminating a vehicle tire is provided. The method includes the steps of arranging a light source on a body of the vehicle to illuminate a wheel assembly comprising a tire and detecting tire inflation pressure of the tire. The method further includes the steps of determining a tire pressure status based on the detected tire inflation pressure and activating the light source to illuminate light on the wheel assembly to indicate the tire pressure status.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a an enlarged perspective view of the lamp assembly employing three LEDs, according to one embodiment;

FIG. 3A is a cross-sectional view of the lamp assembly taken through line IIIA-IIIA of FIG. 3;

FIG. 4 is an enlarged perspective view of a portion of the vehicle body illustrating one of the wheel wells and lamp assembly for illuminating the wheel assembly for a fully inflated tire;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
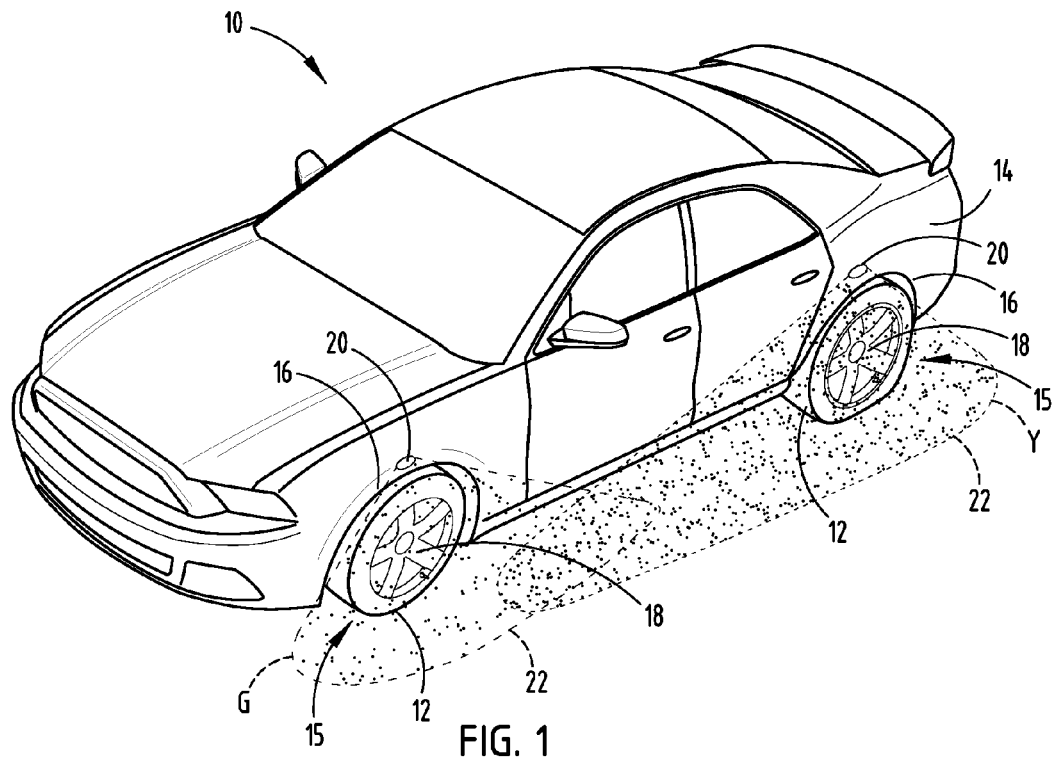
FIG. 1 is a side perspective view of an automotive vehicle having lamp assemblies located near each wheel well for illuminating the corresponding wheel assemblies, according to one embodiment.
Figure 2:
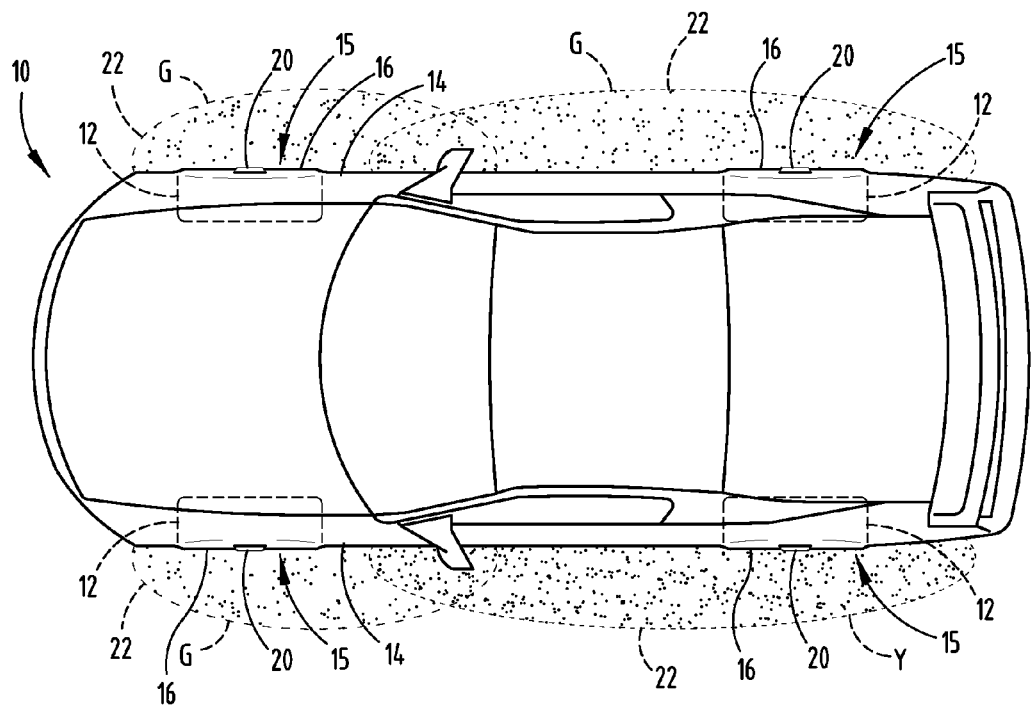
FIG. 2 is a top view of an automotive vehicle having the lamp assemblies shown in FIG. 1.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, an automotive wheeled vehicle 10 is shown in a form of a passenger car having a body 14 and four wheel assemblies 15 having central wheels 18 and rubber tires 12 assembled thereto. The vehicle 10 may include any wheeled vehicle, such as a car, a truck, or a bus having tires that are inflated with pressurized air and in contact with the roadway. Each tire 12 is assembled to the corresponding wheel 18 and is inflated with air preferably at a desired inflation pressure to provide adequate vehicle performance. Tires are typically inflated with pressurized air to a pressure within a desired range as suggested by the tire manufacturer. When the tire pressure drops below a tire pressure limit, the tire may be considered a flat tire.

The vehicle 10 is equipped with a vehicle wheel illumination assembly 20 located near each wheel well 16 on the vehicle body 14 to illuminate a corresponding a wheel assembly 15 including the tire 12 to indicate the tire pressure status. In the example shown, four wheel illumination assemblies 20 are provided to illuminate the four wheel assemblies including the four tires 12, respectively. Each wheel illumination assembly 20 includes a light source located near the wheel well 16 of the vehicle body 14. The wheel illumination assembly 20 is shown located on the upper outer edge of the wheel well 16 and arranged to generate light illumination downward and laterally outward so as to illuminate the outer wall of the corresponding tire 12 and the outer surface of the wheel 15 as well as the ground surface extending laterally outward therefrom. The illumination assembly 20 has a predetermined light color indicative of the status of the tire. According to one embodiment, the light source of the illumination assembly 20 illuminates the tire with a first color light to indicate a low tire pressure when the tire pressure is below a pressure limit and illuminates the tire with a different second color light to indicate sufficient tire pressure when the tire pressure is above the pressure limit. For example, a low tire pressure status may be indicated with the use of a first yellow color light and a second green color light may be employed to indicate sufficient tire pressure status.

In addition to providing lighting for tire inflation indication, the wheel illumination assembly 20 may further illuminate the tires 12, wheels 18 and nearby ground surface with light when a puddle lamp signal is generated to provide puddle lamp lighting. For example, when an operator approaching the vehicle 10 initiates a door unlock activation via an input on a key fob or other device, the four wheel illumination assemblies 20 may all be activated to provide puddle lamp lighting. The puddle lamp lighting provided by wheel illumination assemblies 20 may be in addition to other lighting provided by puddle lamps otherwise provided on the vehicle 10, such as on the rearview exterior mirror assembly, or may replace such puddle lamp assemblies. Further, the wheel illumination assembly 20 may illuminate one or more tires 12, wheels 18 and ground surface when the vehicle 10 is driven and a turn signal is generated to provide a turn signal indication. As such, the light source of the illumination assembly 20 may flash a red, amber or other color light as a turn signal indication in addition to or in place of other vehicle turn signal indicators.

The wheel illumination assembly 20 is further illustrated in FIGS. 3 and 3A, according to one embodiment. In this embodiment, the wheel illumination assembly 20 includes a plurality of light emitting diodes (LEDs), such as three LEDs 24A-24C, all shown mounted to a circuit board 26. Each of LEDs 24A-24C includes electrical circuitry 28 for receiving electrical power to generate light illumination at a desired wavelength or frequency. In one embodiment, each of LEDs 24A-24C generates a light output at a different wavelength, such as 460 nanometer (nm), 470 nm, and 480 nm, respectively. An outer lens with optics 30 is provided to direct the light generated by the light source downward into a desired light projection field to illuminate the outer walls of the wheel assembly including the tire 12 and wheel 18 and the ground surface extending laterally outward from the corresponding tire 12. In addition, the wheel illumination assembly 20 has an inner lens 32 shown located between the outer lens 30 and the LEDs 24A-24C.

The inner lens 32 may be made of plastic and may include different rylene dye impregnations provided in or on plastic lens 32. A first rylene dye when illuminated with 460 nm wavelength light of the first LED emits a red light at a wavelength of about 520 nm. A second rylene dye when illuminated with the 470 nm wavelength light of the second LED emits green light at a wavelength of above 520 nm. A third rylene dye when illuminated with the 480 nm wavelength light of the third LED emits a blue light at a wavelength of about 480 nm. Each of the first, second and third rylene dyes are selected to react with one of the three LEDs at a specific wavelength to generate a light output at a designated wavelength. The rylene dyes may be selected to react with certain wavelengths of blue light to generate a resulting color mix. The first, second and third rylene dyes may be painted or otherwise applied onto the plastic lens 32 and may be formed stacked one on top of another. Examples of energy conversion and the use of rylene dyes for color mixing are disclosed in one or more of U.S. Pat. Nos. 8,415,642; 8,247,761; 8,232,533; 8,178,852; 8,097,843, U.S. Patent Application Publication No. 2011/0012062; and U.S. patent application Ser. No. 14/086,442, filed on Nov. 21, 2013, the entire disclosures of which are hereby incorporated herein by reference. Use of the rylene dye for color mixing allows for the use of less expensive blue LEDs. It should further be appreciated that if the dye coating is translucent, then the first and second dyes may be utilized without the third dye, such that the resulting blue color output comes from the blue LED transmitted through the translucent plastic lens 32. Red, green, blue (RGB) light is then produced from the three (3) blue LEDs. As is commonly known by mixing red, green and blue light, any color light may be obtained. The red, green and blue light can be mixed in different proportions to generate other color lighting.

This lighting assembly allows for the use of cost-effective and efficient LEDs to achieve a desired light illumination. According to other embodiments, different colored light sources, such as LEDs, may be employed to generate a desired light output. For example, alternative red, green, and blue LED packaging having a red LED, a green LED and a blue LED may be used to generate desired colors of light outputs when used in combination, according to known light color mixing techniques.

Referring to FIG. 4, the vehicle wheel illumination assembly 20 is shown generating a first color light illumination on the outer walls of wheel assembly 15 including a tire 12 and wheel 128 and ground surface shown by lighting field 22. In this example, a green color light is illuminated within field 22 and onto the wheel assembly 15 to indicate that the tire inflation pressure of tire 12 is of a pressure exceeding a low pressure limit. The first light could be a white light, according to another example. As such, an operator of the vehicle 10 when approaching the vehicle is presented with a visual indication that the tire pressure is adequate. The tire pressure indication may be presented when the vehicle 10 is not operating and an operator is approaching the vehicle 10, such as when the operator activates the door unlock input button on a key fob.

Figure 5:
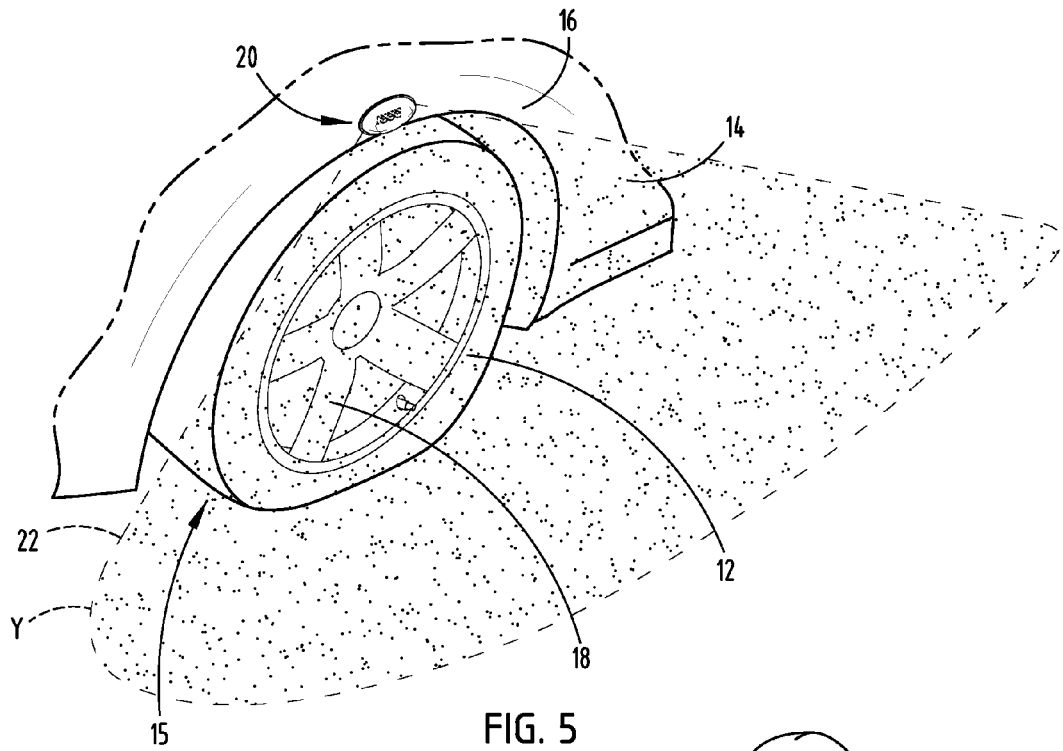
FIG. 5 is an enlarged perspective view of a portion of the vehicle body illustrating one of the wheel wells and lamp assembly for illuminating the wheel assembly for a flat tire indication.

Referring to FIG. 5, the vehicle wheel illumination assembly 20 is shown generating a different second color light illuminated onto the outer walls of the wheel assembly 15 including the tire 12 and surrounding ground surface. In this example, the tire 12 is shown as underinflated having an inflation tire pressure of less than the low pressure limit, also referred to as a flat tire. When the tire pressure is detected as being underinflated, the assembly 20 generates a yellow color light illuminated onto the outer walls of the wheel assembly 15 and its tire 12 and onto the ground surface within lighting field 22 so that an operator of the vehicle 10 approaching the vehicle 10 may readily recognize the flat tire indicator.

Figure 6:
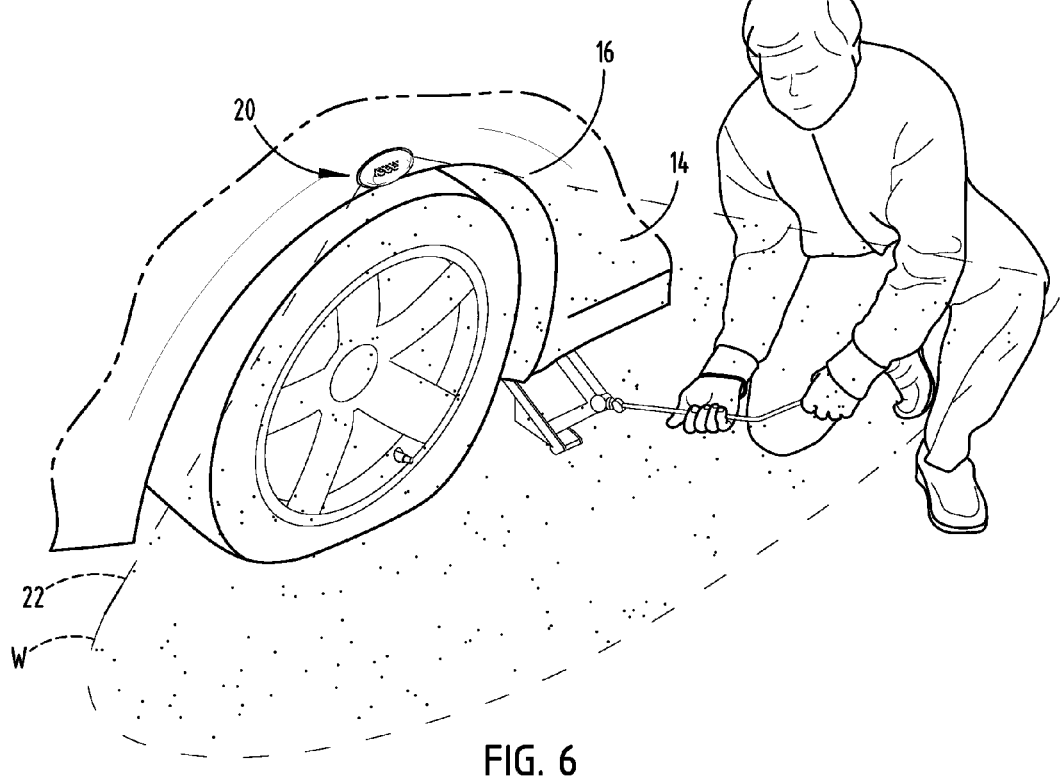
FIG. 6 is an enlarged perspective view of a portion of the vehicle body illustrating one of the wheel wells and lamp assembly for illuminating the wheel assembly for a service light.

Referring to FIG. 6, the vehicle wheel illumination assembly 20 is shown operating as an area light to generate light illumination within a lighting field 22 which also illuminates the wheel assembly 15 including the tire 12 and ground surface. The area light enables an operator to service the vehicle such as inflating or changing the flat tire. The area light may include a third different color light illumination, such as a white light.

It should further be appreciated that the wheel illumination assembly 20 further may be activated to provide puddle lamp lighting when an operator of the vehicle is determined to be approaching the vehicle to enable the operator to enter and exit the vehicle 10. The puddle lamp application may generate a white light or other color light on the wheel assembly 15 and its tires 12 and nearby ground surface. Further, the wheel illumination assembly 20 may generate a desired color lamp to be used as a turn signal indicator when a turn signal is generated while the vehicle is driven. As such, one or more of the wheel illumination assemblies 20 may flash to signal a turn signal as a substitute or in addition to the vehicle turn signals.

Figure 7:
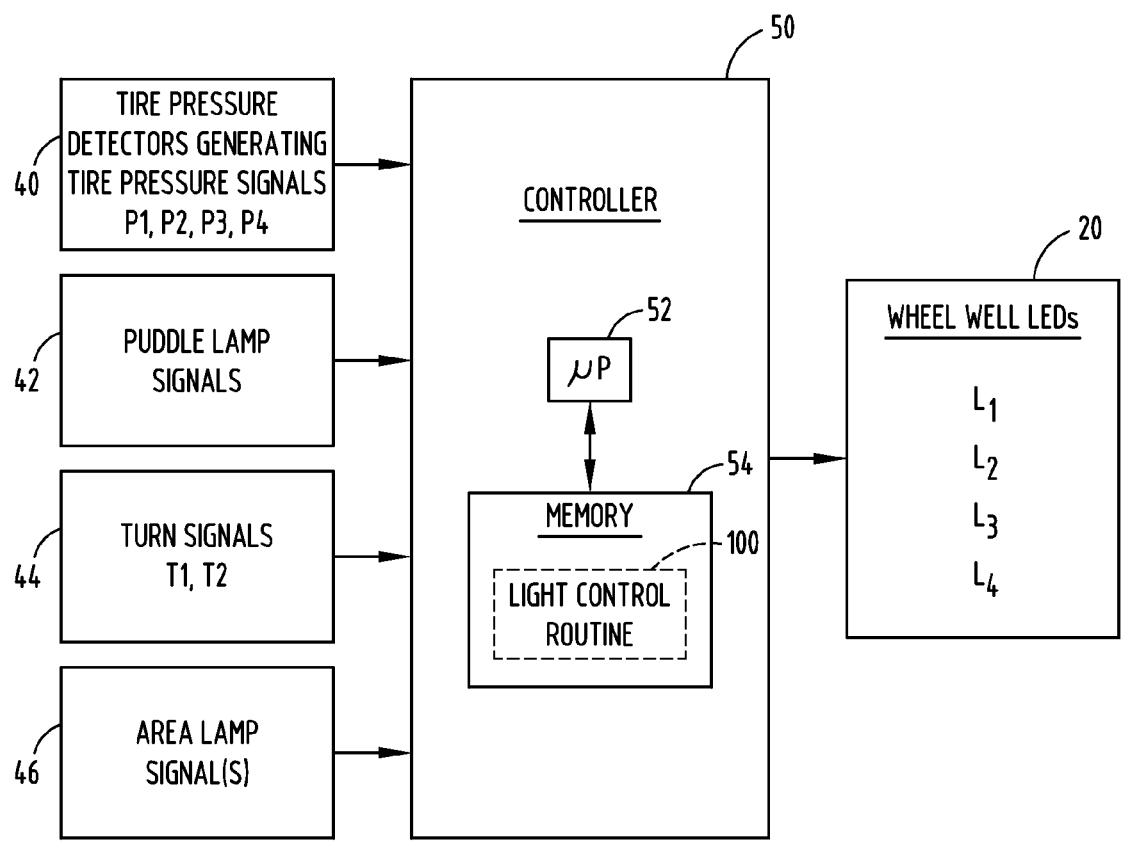
FIG. 7 is a block diagram illustrating the lamp assemblies and controls for providing tire pressure indication, puddle lamp illumination, and turn signal indication.

The vehicle wheel illumination assemblies 20 are shown in FIG. 7 controlled by a controller 50 in response to various inputs. The wheel illumination assemblies 20 each include light sources shown as wheel well LEDs L1-L4 located near wheels for lighting the corresponding tire 12 and wheel assemblies 15. The controller 50 is shown including control circuitry in the form of a microprocessor 52 and memory 54. A light control routine 100 is shown stored in memory 54 and executable by the microprocessor 52. The microprocessor 52 or other control circuitry processes the various inputs and the light control routine 100 and generate outputs to control the wheel well LEDs L1-L4 of the vehicle wheel illumination assemblies 20. It should be appreciated that other analog and/or digital circuitry may be employed to process the various inputs and routines to activate the vehicle wheel illumination assemblies 20.

The inputs to controller 50 include tire pressure signals P1-P4 which are generated by respective tire pressure detectors associated with each tire 12. Each wheel assembly has a tire and a tire pressure detector for detecting the air inflation pressure of the tire 12. As such, four tire pressure detectors are employed to detect four tire pressure signals P1-P4. In addition, puddle lamp signals 42 are input to the controller 50 indicative of a desired activation of puddle lamps. Further, two turn signals T1-T2 are input to the controller 50 indicative of the desired turn indication for when the driver indicates the vehicle is to turn to the left or the right. As such, the two left side wheel illumination assemblies flash light to indicate a left turn and the two right side wheel illumination assemblies flash light to indicate a right turn. Further, one or more area lamp signals 46 may be input to the controller 50 indicative of the driver requesting activation of wheel area lamp lighting. The controller 50 processes the various inputs 40-46 pursuant to the light control routine 100 to activate the vehicle wheel illumination assemblies 20 as described herein.

Figure 8:
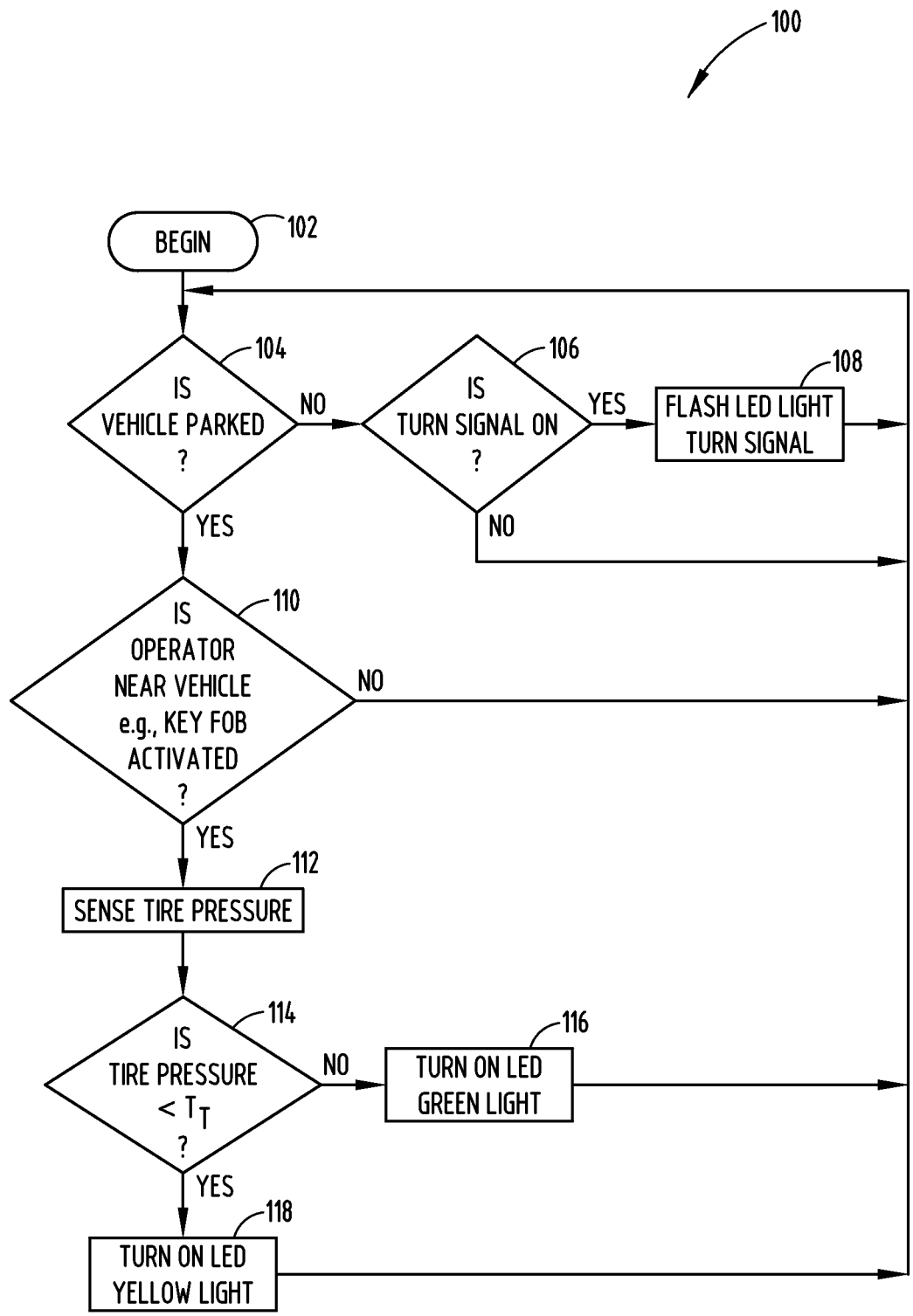
FIG. 8 is a flow diagram illustrating a routine for providing lighted tire pressure indication, puddle lamp illumination, and turn signal indication.

Referring to FIG. 8, the light control routine 100 for controlling the vehicle wheel illumination assembly is illustrated, according to one embodiment. Routine 100 begins at step 102 and proceeds to decision step 104 to determine if the vehicle is parked. If the vehicle is not parked, routine 100 will proceed to decision step 106 to determine if a turn signal is on and, if so, will flash the LED light as a turn signal indicator at step 108 to indicate a desired turning direction before returning to step 104. The turn signal indicator may include flashing the light sources associated with the wheel illumination assemblies 20 on the same side of the vehicle as the vehicle is expected to turn. If the turn signal is not on, routine 100 returns to step 104.

If the vehicle is parked as determined at step 104, routine 100 proceeds to decision step 110 to determine if the operator is near the vehicle. This may include detecting activation of the key fob such as a door unlock button which would indicate that the operator is near the vehicle. If the operator is not near the vehicle, routine 100 returns to step 104. If the operator is determined to be near the vehicle, routine 100 proceeds to step 112 to sense tire pressure for each of the tires on the vehicle. Next, at decision step 114, routine 100 determines if the sensed tire pressure is less than a tire pressure threshold $T_T$. If the tire pressure is not less than tire pressure threshold $T_T$, routine 100 proceeds to step 116 to turn on the LED light associated with that tire with a green light indicative of sufficient tire pressure, before returning to step 104. If the sensed tire pressure is less than the tire pressure threshold $T_T$, routine 100 proceeds to step 118 to turn on the LED light associated with that tire with a yellow light indicative of a low tire pressure, prior to returning to step 104.

Accordingly, the vehicle wheel illumination assembly 20 advantageously provides for a light indication of the tire pressure by illuminating the wheel assembly 15 including the tire with a light source mounted on the vehicle body to indicate the tire pressure status. This enables the operator of the vehicle to confirm adequate tire inflation pressure or to become aware of a low tire pressure situation while the operator is not within the vehicle cabin such that the operator may take corrective action to inflate the tire or change the tire prior to operating the vehicle. The illumination assembly 20 advantageously provides for the addition of puddle lamp lighting, turn signal indication, and area lighting which advantageously allows for integration of such lighting functions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle wheel illumination assembly comprising:
   a light source located on a vehicle body and arranged to illuminate a wheel assembly of the vehicle with a first color light to indicate a tire pressure status, wherein the light source illuminates a wheel and tire of the wheel assembly and ground proximate to the tire to enable servicing of the tire with a different color light.

2. The assembly of claim 1, wherein the light source illuminates an outer wall of the tire of the wheel assembly to indicate the tire pressure status.

3. The assembly of claim 1, wherein the light source is located on the vehicle body near a wheel well of the vehicle.

4. The assembly of claim 1, wherein the light source illuminates the wheel assembly with the first color light to indicate low tire pressure when the tire pressure is below a pressure limit and illuminates the wheel assembly with a different second color light to indicate sufficient tire pressure when the tire pressure is above the pressure limit.

5. The assembly of claim 1, wherein the light source further illuminates the wheel assembly when a puddle lamp signal is generated to provide puddle lamp lighting.

6. The assembly of claim 1, wherein the light source further illuminates the wheel assembly when a turn signal is generated to provide a turn signal indication.

7. The assembly of claim 1 further comprising a tire pressure detector for detecting the tire pressure, wherein the light source illuminates the wheel assembly of the vehicle to indicate the tire pressure status indicative of the detected tire pressure.

8. The assembly of claim 1, wherein the light source comprises a plurality of light emitting diodes, each generating a different color light illumination.

9. The assembly of claim 8, wherein the light source further comprises a lens comprising a plurality of dye, wherein each of the light emitting diodes transmit light through one of the plurality of dye to generate a desired color output.

10. A vehicle tire pressure indicator assembly comprising:
    a light source located on a body of a vehicle; and
    a tire pressure detector for detecting air inflation pressure of a tire on a wheel assembly of the vehicle, wherein the light source illuminates the wheel assembly with light to indicate a tire pressure status based on the detected tire pressure and illuminates the tire and ground pro nate to the tire to enable servicing of the tire.

11. The assembly of claim 10, wherein the light source illuminates an outer wall of the tire with a first color light to indicate the tire pressure status and illuminates the tire and ground with a different color light to enable servicing of the tire.

12. The assembly of claim 10, wherein a light source is located on the vehicle body near a wheel well of the vehicle.

13. The assembly of claim 10, wherein the light source illuminates the wheel assembly with a first color light to indicate low tire pressure when the tire pressure is below a pressure limit and illuminates the wheel assembly with a different second color to indicate sufficient tire pressure when the tire pressure is above the pressure limit.

14. The assembly of claim 10, wherein the light source further illuminates the wheel assembly when a puddle lamp signal is generated to provide puddle lamp lighting.

15. The assembly of claim 10, wherein the light source further illuminates the wheel assembly when a turn signal is generated to provide a turn signal indication.

16. A method of illuminating a vehicle tire comprising:
arranging a light source on a body of the vehicle to illuminate a wheel assembly comprising a tire;
detecting tire inflation pressure of the tire;
determining a tire pressure status based on the detected tire inflation pressure; and
activating the light source to illuminate light on the wheel assembly to indicate the tire pressure status with a first color light and to illuminate the ground proximate the tire to aid in servicing the tire with a different color light.

17. The method of claim 16, wherein the step of activating the light source comprises generating the first color light to indicate low tire pressure when the tire pressure is below a pressure limit and generating a different second color light to indicate sufficient tire pressure when the tire pressure is above the pressure limit.

18. The method of claim 16 further comprising the step of activating the light source to illuminate the wheel assembly when a puddle lamp signal is generated to provide puddle lamp lighting.

19. The method of claim 16 further comprising the step of activating the light source to illuminate the wheel assembly when a turn signal is generated to provide a turn signal indication.

20. The method of claim 16, wherein the light source illuminates an outer wall of the tire.

* * * * *